R. E. MUFFLY.
TIRE CHAIN.
APPLICATION FILED MAY 26, 1919.
1,336,369.
Patented Apr. 6, 1920.
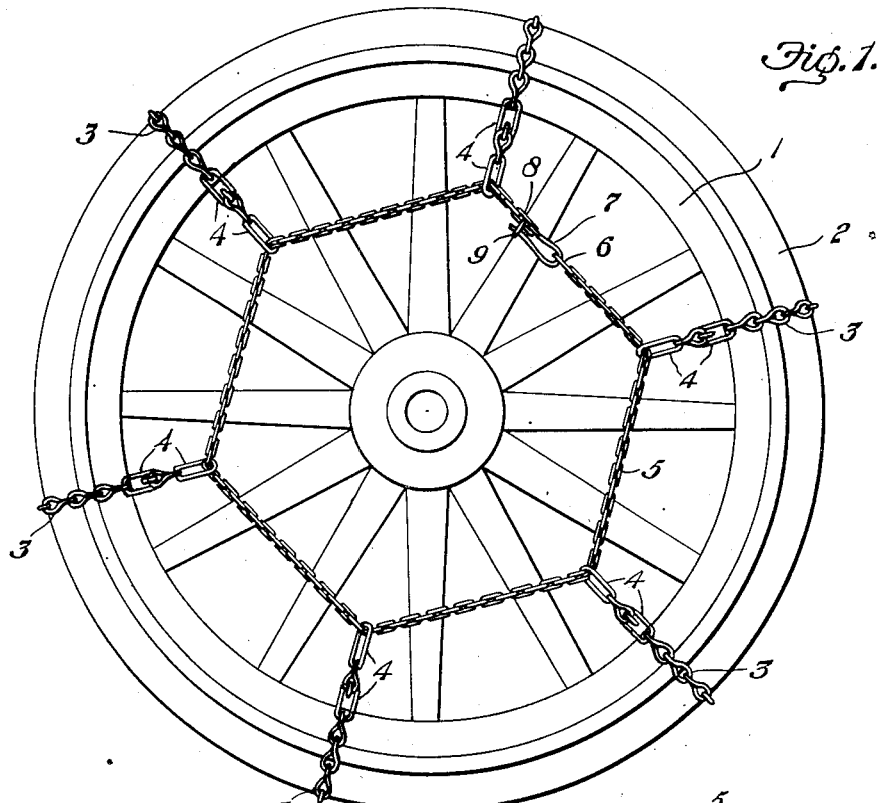
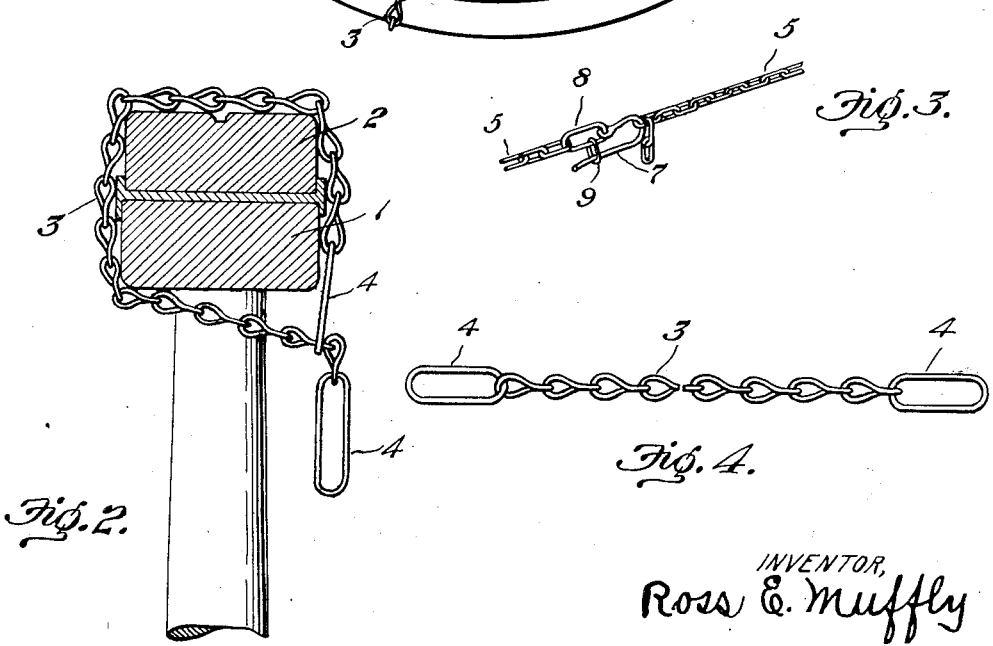
INVENTOR,
Ross E. Muffly
ATTY'S.

UNITED STATES PATENT OFFICE.

ROSS E. MUFFLY, OF CANTON, OHIO.

TIRE-CHAIN.

1,336,369.　　　　Specification of Letters Patent.　　Patented Apr. 6, 1920.

Application filed May 26, 1919. Serial No. 299,754.

*To all whom it may concern:*

Be it known that I, ROSS E. MUFFLY, a citizen of the United States, residing at Canton, in the county of Stark and State of Ohio, have invented a new and useful Tire-Chain, of which the following is a specification.

This invention relates to tire chains for motor vehicles and more especially to anti-skid tire chains for heavy motor trucks.

The object of the invention is to provide an anti-skid tire chain which may be readily and conveniently applied and having the several units thereof so arranged and mounted that each unit is free to adapt or adjust itself to the varying tractive positions imposed thereon with no chance of becoming unhooked or lost.

A further object is the provision of a tire chain of this character comprising a plurality of cross chains each having an elongated enlarged link at each end, each cross chain being arranged to be located around the felly and tire, one of said elongated links passed over the other of said elongated links and an adjustable tie chain arranged to be passed through the free elongated link of the cross chain and connected together at its ends with the specially constructed safety hook which can be easily unfastened under any circumstances.

A further object of the invention is to provide a tire chain wherein any of the cross chains may be quickly and easily removed and replaced and the number of such cross chains multiplied to any desired extent according to the degree of traction required with but the one safety hook to take care of the whole assembly.

Another object is the provision of a tire chain of this character comprising a plurality of cross chains which are reversible so that either end thereof may be placed around the wheel, thus doubling the life of the cross chains as when the bearing surface of a cross chain becomes worn, this chain may be taken off and reversed presenting a new bearing surface.

A further object of the invention is to provide an anti-skid tire chain which will be simple, strong and durable and which may be economically and easily manufactured and repaired.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

The invention thus set forth in general terms is illustrated in the accompanying drawings forming part hereof, in which—

Figure 1 is a side view of a motor vehicle wheel with the tire chain applied thereto;

Fig. 2, a fragmentary transverse sectional view of the same;

Fig. 3, a view of the ends of the tie chain showing the connecting hook; and

Fig. 4, a view of one of the cross chains.

A practical embodiment of the invention is disclosed in the accompanying drawings, forming a part of this specification in which similar numerals of reference indicate corresponding parts throughout the several views.

Referring more especially to the construction illustrated in the accompanying drawings, it will be noted that the invention comprises any desired number of cross chains which are adapted to be located around the tire and felly at spaced points, each cross chain carrying an elongated enlarged link at each end, one end of the chain being loosely strung through the elongated ring through the other end of the chain, the elongated ring upon the free ends of the cross chains loosely and slidably receiving a tie chain which is common to all of the cross chains and the ends of which are connected together by a hook which prevents accidental unfastening of the chain.

The wheel of a motor vehicle is shown conventionally provided with the felly 1 and tire 2. The cross chains 3 which may be of any desired number necessary to meet varying tractive conditions may be formed of either twisted or straight links and provided at each end with an enlarged elongated link 4. Each of these cross chains is of suitable length to be passed around the felly and tire as best shown in Fig. 2 of the drawings, one end thereof being passed through the elongated link 4 upon the other end of the cross chain.

An adjustable loop is thus formed around the felly and tire, the free end of each cross chain being extended toward the center of the wheel, the elongated link 4 upon said free end of each cross chain loosely and slidably receiving the tie chain 5. This tie chain is preferably made formed of lighter links than the cross chains and is provided with the hook 7, said hook loosely attached to an elongated link 8 carried by the tie chain, a small ring or link 9 being loosely carried by the link 8 and arranged to be placed over the end of the hook, as best shown in Fig. 3 to prevent the ends of the tie chain from accidentally opening. The hook 7 is adapted to be engaged with any link in the other end of the tie chain thus allowing for adjustment of the tie chain and cross chains as required.

From the above description it will be apparent that this construction has many advantages over the usual tire chains. It should be noted that the cross chains are interchangeable and that both ends of each cross chain are formed in the same manner so that either end may be placed around the wheel so as to give double life to the cross chains. It will furthermore be apparent that the device may be easily attached to a wheel from the outer side of the wheel, it not being necessary to reach over the wheel or to crawl beneath the vehicle in order to apply the fastening device.

It will further be apparent that the cross chains and the flexible tie chain coöperate, the cross chains being each individually adjustable and held in position by the tie chain which can be adjusted to any desired tightness.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:

A tire chain for vehicle wheels, comprising a plurality of cross chains arranged to encircle the rim and tire, an elongated enlarged link on each end of each cross chain, said links being similar whereby either end of each cross chain may be passed through the enlarged link on the other end thereof and a tie chain arranged to be passed through the elongated links on the free ends of the cross chains.

In testimony that I claim the above, I have hereunto subscribed my name.

ROSS E. MUFFLY.